United States Patent [19]
Miller et al.

[11] Patent Number: 5,716,154
[45] Date of Patent: Feb. 10, 1998

[54] ATTACHMENT DEVICE

[75] Inventors: Marvin Herbert Miller, Flushing; David Allen Hoptry, Grand Blanc, both of Mich.

[73] Assignee: General Motors Corporation, Detroit, Mich.

[21] Appl. No.: 704,798

[22] Filed: Aug. 26, 1996

[51] Int. Cl.$^6$ ........................................... F16B 1/00
[52] U.S. Cl. .................................... 403/22; 403/353
[58] Field of Search .......................... 403/393, 282, 403/274, 22, 353; 5/201, 282.1, 299; 411/533, 427, 386

[56] References Cited

U.S. PATENT DOCUMENTS

| Re. 31,106 | 12/1982 | Pufpaff et al. ............. | 403/353 |
|---|---|---|---|
| 397,708 | 2/1889 | Fernau ..................... | 5/282.1 X |
| 2,628,372 | 2/1953 | Metzger ................... | 5/299 |
| 3,238,581 | 3/1966 | Sawyer .................... | 411/533 X |
| 3,966,296 | 6/1976 | Ericson .................... | 403/22 X |
| 4,303,267 | 12/1981 | Haberle et al. ............. | 403/22 X |
| 5,158,390 | 10/1992 | Ito et al. .................. | 403/282 |

FOREIGN PATENT DOCUMENTS 440660   1/1936   United Kingdom .

*Primary Examiner*—Kenneth J. Dorner
*Assistant Examiner*—William L. Miller
*Attorney, Agent, or Firm*—Charles E. Leahy

[57] ABSTRACT

First and second members are attached together by an attachment device which includes a key hole shaped slot provided in the first member and having an enlarged entry portion communicating with a narrow slot portion. An aperture is provided in the second member and a bolt having a threaded shank and an enlarged head is press fit part way into the aperture of the second member so that the enlarged head is spaced somewhat longitudinally away from engaging the second member. The second member is hung on the first member by inserting the enlarged head of the bolt through the entry portion of the key hole shaped slot and then sliding the second member laterally of the first member so that the shank enters the narrower slot portion. A nut, is threaded on to the threaded shank and tightened so that the press fit of the shank of the bolt is forcibly pulled further through the aperture of the second member and the enlarged head of the bolt is drawn tightly against the first member to securely attach together the first and second members. The shank of the bolt preferably has splines thereon by which the press fit of the shank into the aperture resists rotation of the bolt shank and promotes axial movement of the bolt shank through the aperture during tightening of the nut. In addition, the nut preferably has an unthreaded bore portion which is larger than the splines of the shank so that the nut may be fully threaded on to the bolt without the splines interfering with the threads of the nut.

6 Claims, 3 Drawing Sheets

ATTACHMENT DEVICE

TECHNICAL FIELD

The invention relates to an attachment device for connecting together first and second members.

BACKGROUND OF THE INVENTION

It is well known in modern manufacture to attach together first and second members. For example, a vehicle body may be comprised of a sheet metal stamped member and it may be desirable and necessary to attach a second member, such as a vehicle component, to the vehicle body in an economical and efficient manner.

It is well known to attach together two such members by having a hole in one member and a bolt associated with the other member to reach through the hole. A nut is then threaded on to the bolt to complete the connection. However, in many applications, particularly in motor vehicles, access may not be available to the back side of the one member to enable the installation of the nut. Accordingly, it is desirable to provide an attachment device which enables attachment without necessitating access to the back side of the member.

It is also desirable in motor vehicle attachments to provide an attachment arrangement by which a component can be readily hung upon the vehicle body in a loose fitting and temporary fashion and to then subsequently complete the attachment by tightening down a bolt. In this manner, a plurality of components may be hung upon the vehicle by a first assembly operator, and then a second assembly operator can use an air powered wrench to tighten bolts associated with a number of such components.

SUMMARY OF THE INVENTION

According to the invention, first and second members are attached together by an attachment device which includes a key hole shaped slot provided in the first member and having an enlarged entry portion communicating with a narrow slot portion. An aperture is provided in the second member and a bolt having a threaded shank and an enlarged head is press fit part way into the aperture of the second member so that the enlarged head is spaced somewhat longitudinally away from engaging the second member. The second member is hung on the first member by inserting the enlarged head of the bolt through the entry portion of the key hole shaped slot and then sliding the second member laterally of the first member so that the shank enters the narrower slot portion. A nut is threaded onto the threaded shank and tightened so that the press fit of the shank of the bolt is forcibly pulled further through the aperture of the second member and the enlarged head of the bolt is drawn tightly against the first member to securely attach together the first and second members. The shank of the bolt preferably has splines thereon by which the press fit of the shank into the aperture resists rotation of the bolt shank and promotes axial movement of the bolt shank through the aperture during tightening of the nut. In addition, the nut preferably has an unthreaded bore portion which is larger than the splines of the shank so that the nut may be fully threaded on to the bolt without the splines interfering with the threads of the nut.

The invention also includes one of the members having a projection and the other member having a recess so that the projection comes in alignment with the recess and enters the recess when the members are slid relative to each other so that the engagement between the projection and the recess will prevent relative rotation between the members, particularly when torque is applied to tighten the nut on the bolt.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
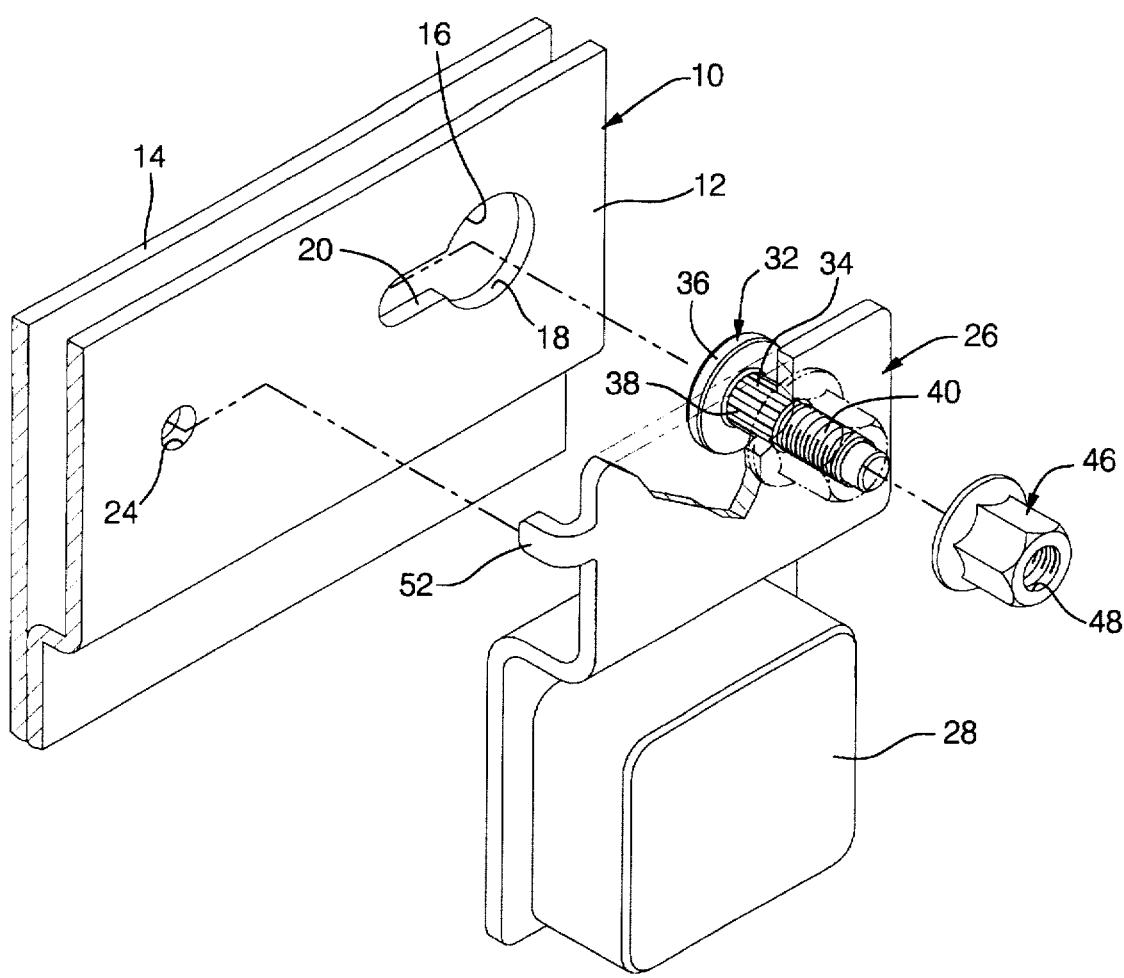
FIG. 1 is a perspective view of a vehicle component member for attachment on to the vehicle support member by the attachment device of this invention.

Referring to FIG. 1, it is seen that a first member 10, which may for example be a support member of a motor vehicle body, includes a first panel 12 and a second panel 14 which are welded together. The first panel 12 has a key hole slot 16 which includes an enlarged access portion 18 and a narrower slot portion 20. The first panel 12 of the support member 10 also includes a hole or recess 24 which is spaced away from the key hole slot 16.

A second member 26 is provided for mounting on the support member 10 and carries a component 28 such as a switch, a sensor, an actuator, a closure, a molding or any other component or member which is to be attached on to the support member 10.

Figure 2:
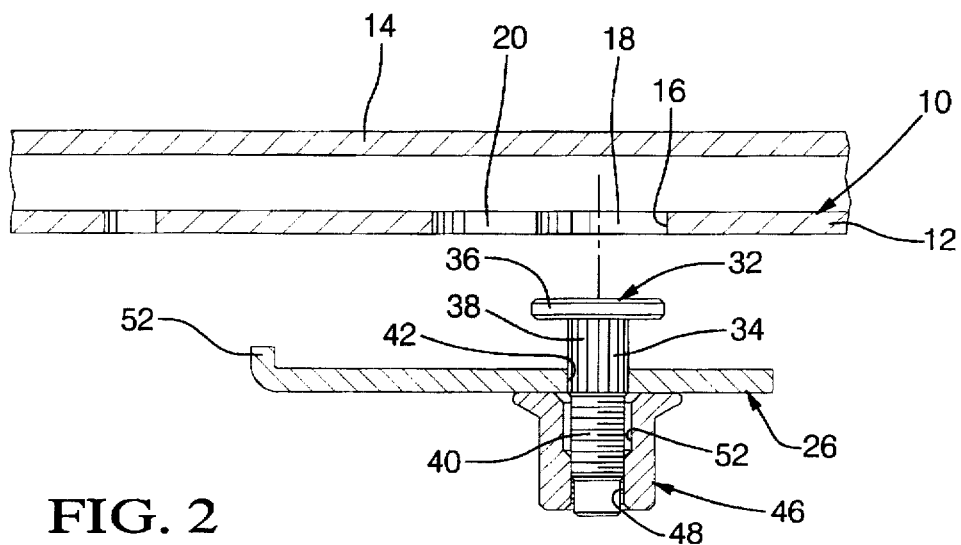
FIG. 2 is a plan view corresponding to FIG. 1 and showing the component member spaced away from the support member.

As seen in FIGS. 1 and 2, a bolt 32 is mounted on the second member 26 and includes a shank 34 and an enlarged head 36. The head 36 has a diameter slightly smaller than the size of the enlarged access opening 18 of the key hole slot as will be discussed hereinafter.

As best seen in FIG. 2, the shank 34 includes a splined portion 38 which is closest to the head 36 and a threaded portion 40 furthest from the head 36. As seen in FIG. 2, the bolt 32 is installed on to the second member 26 by press fitting the shank into an aperture 42 of the second member 26. The bolt is press fit part way into the second member 26, as shown in FIG. 2, so that the head 36 is spaced axially away from the second member 26 by a distance greater than the thickness of the second panel 12 of the support member 10.

As seen in FIG. 2, a hex nut 46 is threaded on to the threaded portion 40 of the bolt 32 via internal threads 48 carried by the nut 46. The nut 46 has a bore portion 52 which is larger in diameter than the threaded portion 40 and also larger in diameter than the splines 38. Furthermore, as seen in FIGS. 1 and 2, the second member 26 carries a projection 52, which is preferably a finger struck from the second member 26.

FIG. 2 shows the second member 26 spaced away from the support member 10 in readiness for attachment thereto.

Figure 3:
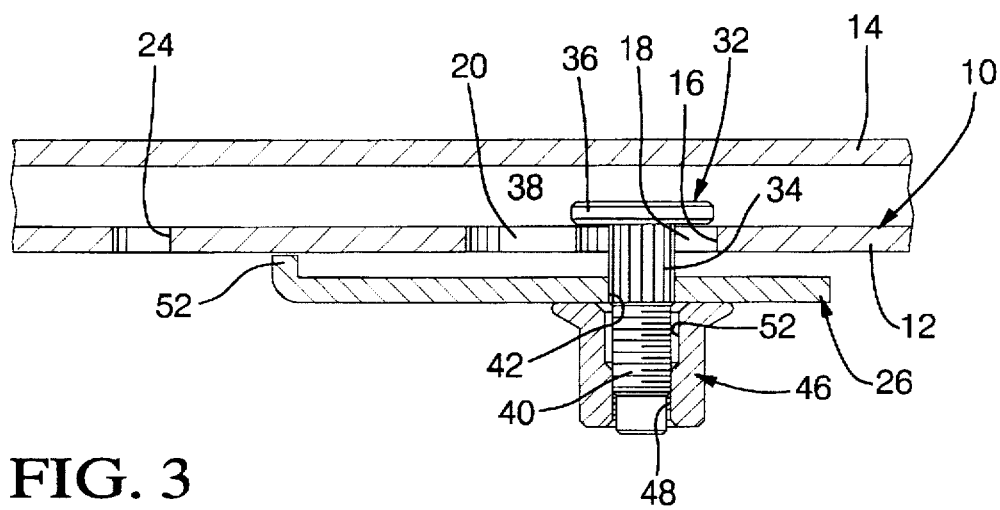
FIG. 3 is a view similar to FIG. 2 but showing the head of the bolt installed into the enlarged access portion of the key hole shaped aperture of the support member.

Referring to FIG. 3, it will be appreciated that the enlarged head 36 of bolt 32 has been inserted through the enlarged access portion 18 of the key hole slot 16.

Figure 4:
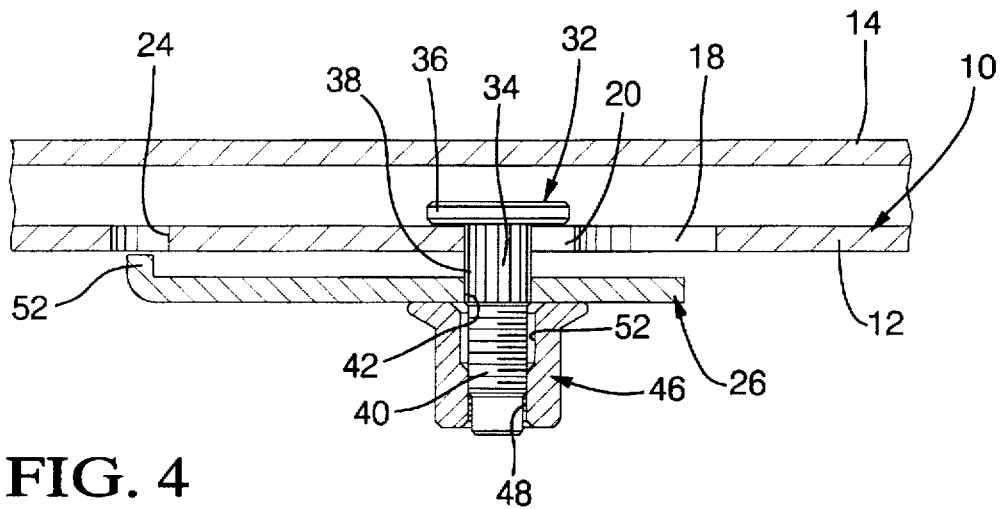
FIG. 4 shows the component member having been slid laterally leftwards to carry the shank into the narrow slot portion of the key hole shaped slot.

Referring to FIG. 4, it is seen that the second member 26 has been shifted laterally in the leftward direction so that the shank 38 of the bolt has entered into the narrow slot portion of the key hole shaped aperture 16. Furthermore, as seen in FIG. 4, this leftward shifting, lateral sliding of the second member 26 has carried the projection 52 into alignment with the recess 24 in the first member 10. As seen in FIG. 4, the installation of the shank into the key hole slot, will cause the second member 26 to hang freely from the second member 10 in readiness for subsequent tightening of the attachment device.

Figure 5:
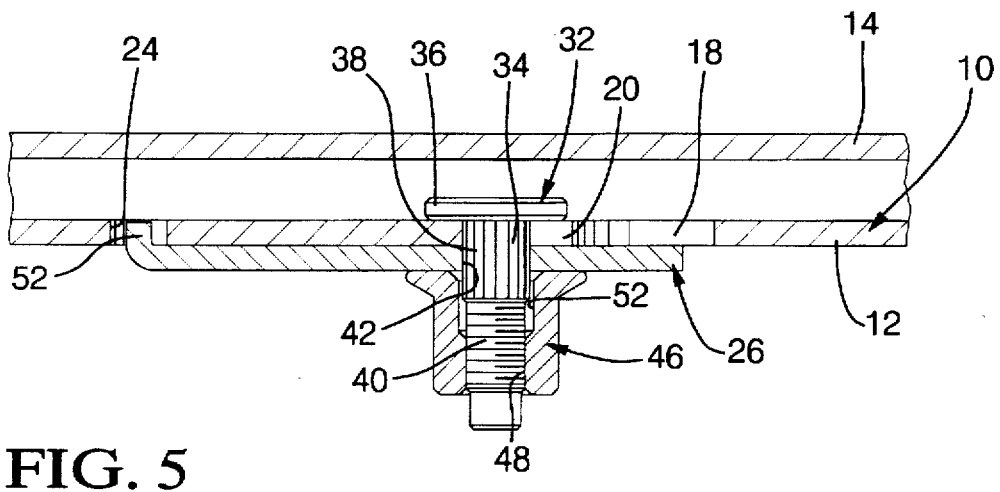
FIG. 5 shows the nut having been tightened onto the shank to pull the head of the bolt tightly against the support member.

Referring to FIG. 5, it is seen that the tightening of the attachment device is obtained by forcibly rotating the nut 46 on to the bolt 32. The rotation of the nut 46 will impart torque to the bolt 32. However, the splines 38 press fit into the aperture 38 of the second member 26 function to retain the bolt 32 against rotation and limit relative motion of the bolt to axial movement. Thus, it will be understood that the rotation of the nut 46 will draw the bolt 32 axially in the direction to carry the enlarged head 36 of the bolt into engagement with the support member 10. This tightening movement is accommodated by the enlarged bore portion 52 inside the nut which prevents any interference of the threads 48 of the nut 46 with the splines 38 of the shank. During this tightening, the projection 52 is seated within the recess 24 to prevent rotation.

Figure 6:
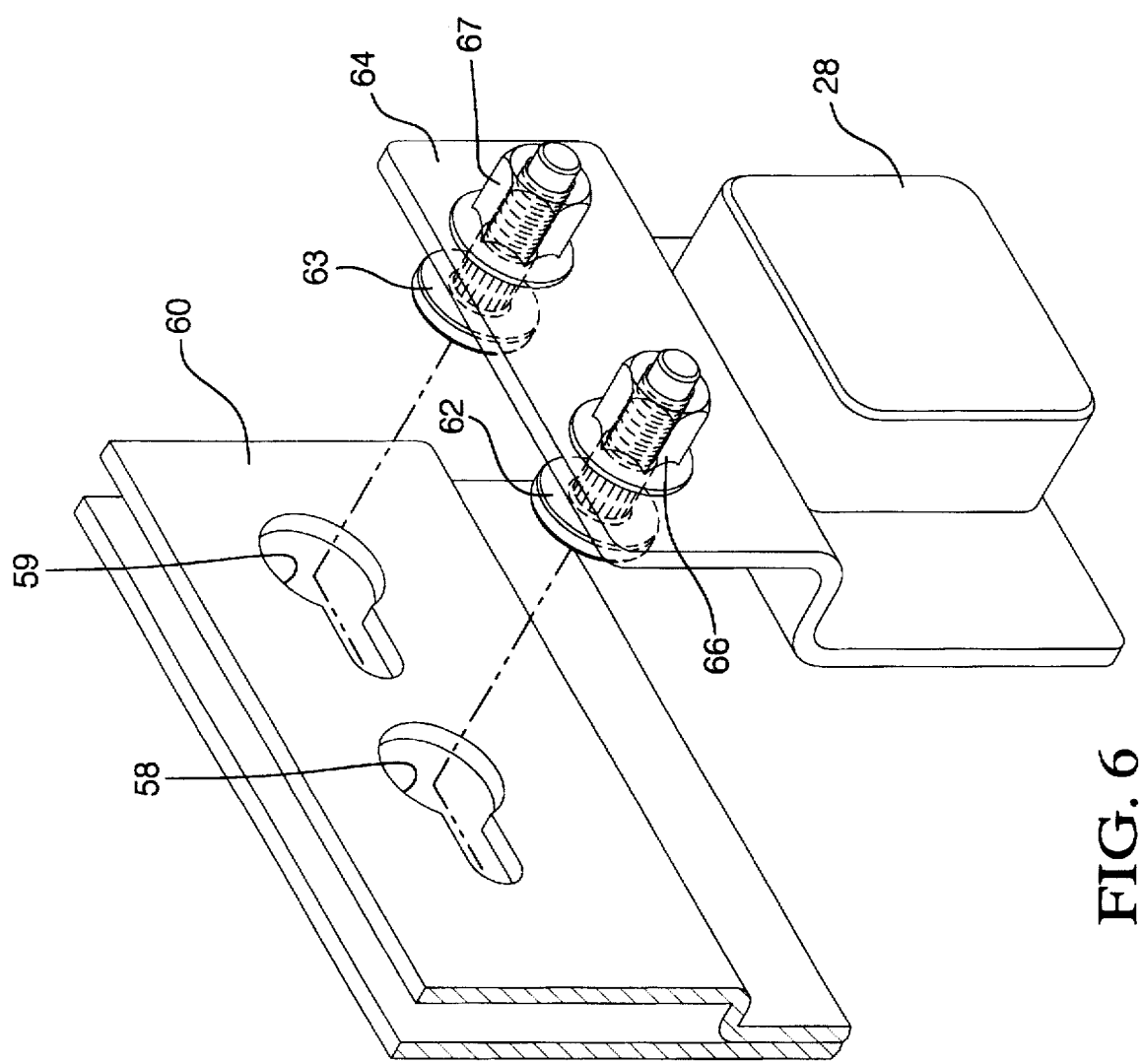
FIG. 6 shows a second embodiment of the invention in which a pair of the attachment devices are employed to mount a component member on the support member.

Referring to FIG. 6, a second embodiment of the invention is shown in which a pair of key hole slots 58 and 59 are provided in a first member 60 and a pair of bolts 62 and 63 are provided on the second member 64. Accordingly, the second member 64 may be readily hung on the first member 60 by simply inserting the bolt heads into the key hole slots and then sliding the second member 64 leftwardly. Subsequent tightening of nuts 66 and 67 will complete the attachment of the second member 64 on to the first member 60.

Thus, it is seen that the invention provides a new and improved attachment device which is particularly suited for applications in which there is insufficient access to the backside of a vehicle body panel. Furthermore, it will be appreciated that the invention provides an attachment device in which a bolt and a nut may be pre-assembled on to a component member before shipment for handling as a unit rather than as separate pieces to be subsequently assembled together.

In addition, it will be appreciated that the attachment device of this invention provides efficiencies in the assembly operations as a vehicle body component can be temporarily hung in self-supporting fashion on a vehicle body structure for subsequent completion of the attachment by tightening of the nut on to the bolt.

We claim:

1. An attachment device comprising:

a first member having a key hole shaped slot including an enlarged entry portion communicating with a narrower slot portion;

a second member having an aperture;

a bolt having a shank with an enlarged head at one end of the shank and a threaded portion at the other end of the shank, said shank being press fit part way into the aperture of the second member so that the enlarged head may be installed through the entry portion of the key hole shaped slot and then the second member may be slid laterally of the first member so that the shank enters the narrower slot portion; and a nut threaded on to the threaded portion of the shank and adapted to be tightened to overcome the press fit so that the shank is forcibly pulled further through the aperture of the second member and the enlarged head of the bolt is drawn tightly against the first member to securely attach together the first and second members.

2. The attachment device of claim 1 further characterized by the shank of the bolt having splines thereon by which the press fit of the shank into the aperture resists rotation of the bolt and promotes axial movement of the shank through the aperture during tightening of the nut.

3. The attachment device of claim 2 further characterized by the nut having a bore which is larger than the splines of the shank so that the nut may be fully threaded on to the bolt without the splines interfering with the threads of the nut.

4. The attachment device of claim 1 further characterized by one of the members having a projection and the other member having a recess and the projection coming into alignment with the recess and entering the recess when the members are slid relative to each other so the engagement of the projection in the recess prevent relative rotation between the members.

5. The attachment device of claim 2 further characterized by one of the members having a projection and the other member having a recess and the projection coming into alignment with the recess and entering the recess when the members are slid relative each other so the engagement of the projection in the recess prevent relative rotation between the members.

6. An attachment device comprising:

a first member having a key hole shaped slot including an enlarged entry portion communicating with a narrower slot portion;

a second member having an aperture;

a bolt having a shank and an enlarged head, said shank having a splined portion nearest the head and a threaded portion, said splined portion being press fit part way into the aperture of the second member with the enlarged head spaced axially away from engaging the second member to permit installation of the enlarged head through the entry portion of the key hole shaped slot and lateral sliding movement of the second member relative the first member so that the shank enters the narrower slot portion;

and a nut threaded on to the threaded portion and shank and adapted to be tightened so that the press fit of the shank is forcibly pulled axially further through the aperture of the second member while the splines prevent the bolt from rotating in the aperture so that the enlarged head of the bolt is drawn tightly against the first member to securely attach together the first and second members, said nut further having a bore which is larger than the splines of the shank so that the nut may be fully threaded on to the bolt without the splines interfering with the threads of the nut.

\* \* \* \* \*